United States Patent
Fung

[19]

[11] Patent Number: 5,969,591

[45] Date of Patent: *Oct. 19, 1999

[54] SINGLE-SIDED DIFFERENTIAL PRESSURE SENSOR

[75] Inventor: Clifford D. Fung, Mansfield, Mass.

[73] Assignee: The Foxboro Company, Foxboro, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/657,177

[22] Filed: Jun. 3, 1996

Related U.S. Application Data

[63] Continuation-in-part of application No. 08/210,422, Mar. 18, 1994, abandoned, which is a continuation-in-part of application No. 08/038,664, Mar. 26, 1993, Pat. No. 5,357,808, which is a division of application No. 07/676,914, Mar. 28, 1991, Pat. No. 5,220,838.

[51] Int. Cl.⁶ .............................. G01L 1/22; H01C 10/10; G01D 18/00

[52] U.S. Cl. ................................. 338/42; 338/4; 73/721

[58] Field of Search ....................... 338/4, 6, 36, 42; 73/721

[56] References Cited

U.S. PATENT DOCUMENTS

| | | | |
|---|---|---|---|
| 4,287,501 | 9/1981 | Tominaga et al. | 338/42 |
| 4,670,969 | 6/1987 | Yamada et al. | 437/84 |
| 4,744,863 | 5/1988 | Guckel et al. | 156/653.1 |
| 4,766,666 | 8/1988 | Sugiyama et al. | 338/4 |
| 4,771,638 | 9/1988 | Sugiyama et al. | 73/721 |
| 4,773,269 | 9/1988 | Knecht et al. | 73/706 |
| 4,790,192 | 12/1988 | Knecht et al. | 73/721 |
| 4,853,669 | 8/1989 | Guckel et al. | 338/4 |
| 4,993,266 | 2/1991 | Omura et al. | 73/720 |
| 5,022,270 | 6/1991 | Rud, Jr. | 73/706 |
| 5,062,302 | 11/1991 | Petersen et al. | 73/754 |
| 5,220,838 | 6/1993 | Fung et al. | 73/721 |
| 5,285,690 | 2/1994 | Koen et al. | 73/727 |
| 5,295,395 | 3/1994 | Hocker et al. | 73/721 |
| 5,319,981 | 6/1994 | Mei et al. | 73/721 |
| 5,323,656 | 6/1994 | Fung et al. | 73/718 |
| 5,357,807 | 10/1994 | Guckel et al. | 73/721 |
| 5,357,808 | 10/1994 | Fung et al. | 73/721 |
| 5,375,473 | 12/1994 | Ikeda et al. | 338/4 |
| 5,483,834 | 1/1996 | Frick | 73/724 |
| 5,583,296 | 12/1996 | Mokwa et al. | 73/718 |

FOREIGN PATENT DOCUMENTS

| | | |
|---|---|---|
| 0553725 | 8/1993 | European Pat. Off. . |
| WO 9417383 | 8/1994 | WIPO . |

*Primary Examiner*—Peter S. Wong
*Assistant Examiner*—Bao Q Vu
*Attorney, Agent, or Firm*—Lahive & Cockfield, LLP

[57] ABSTRACT

A single-sided differential pressure sensing chip having a cavity formed in the top surface of a substrate, a deformable diaphragm spanning the cavity, and a pressure passage connecting the top surface of the substrate with the cavity, and a method of making the same are described. A first fluid pressure applied to the top surface of the substrate in the vicinity of the diaphragm exerts a force on the top surface of the diaphragm, and a second fluid pressure applied to the top surface of the substrate near the pressure passage exerts a force on the bottom surface of the diaphragm. The diaphragm deflects in response to the forces exerted upon it, and a sensing element detects the flexing of the diaphragm. The pressure sensing chip can be contained within a housing structure formed of a carrier and a cap. The housing structure forms a first pressure chamber that communicates with the top surface of the diaphragm and a second pressure chamber that communicates with the bottom surface of the diaphragm through the pressure passage. The cap can include a first opening for connecting a first fluid pressure with the first chamber, and a second opening for connecting a second fluid pressure with the second chamber.

20 Claims, 8 Drawing Sheets

SINGLE-SIDED DIFFERENTIAL PRESSURE SENSOR

RELATED APPLICATIONS

This application is a continuation-in-part of the commonly-owned U.S. patent application Ser. No. 08/210,422, filed on Mar. 18, 1994 now abandoned; which is a continuation-in-part of the commonly-owned copending U.S. patent application Ser. No. 08/038,664, filed on Mar. 26, 1993, and which issued as U.S. Pat. No. 5,357,808; that in turn is a divisional application of U.S. patent application Ser. No. 07/676,914, filed on Mar. 28, 1991, which issued as U.S. Pat. No. 5,220,838. The disclosure of each foregoing application is incorporated herein by reference.

FIELD OF THE INVENTION

This invention relates to pressure sensors fabricated on semiconductor substrates. More particularly, it relates to a single-sided pressure sensor for sensing differential pressure, and to a method of manufacturing such a sensor.

BACKGROUND OF THE INVENTION

One type of semiconductor pressure sensor utilizes a two-wafer construction formed of a flexible silicon diaphragm laminated to a non-deflecting substrate, as disclosed in Knecht et al., U.S. Pat. No. 4,790,192. A sensing element for measuring diaphragm deflection, typically by capacitive or resistive techniques, is secured to the diaphragm. The deflection of the diaphragm, due to pressure variations applied to the diaphragm, causes changes in the electrical characteristics of the sensing element. These changes can be measured and converted into a pressure-responsive electrical signal for further processing.

Pressure sensors can be constructed to measure absolute pressure and to measure differential pressure. In one form of an absolute pressure sensor, a flexible diaphragm spans a sealed cavity in the substrate. As a first fluid pressure external to the sensor varies, the diaphragm deflects and activates the sensing element. In a corresponding form of a differential pressure sensor, a first fluid pressure is applied to the top face of a diaphragm that spans a cavity in the substrate, and the bottom face of the diaphragm is exposed to a second fluid pressure. The bottom face, or underside, of the diaphragm is typically exposed by forming a port through the substrate. The flexible diaphragm in the differential pressure sensor deflects in response to the difference between the external pressures applied to the top of the pressure sensor and to the bottom of the pressure sensor. Accordingly, differential pressure sensors generally are suited to situations where two distinct fluid pressures can be applied to opposing sides of the sensor diaphragm.

Processes used to manufacture differential pressure sensors having semiconductor structures include numerous difficult manufacturing steps. In particular, etching techniques used to form the port through the substrate to the bottom face of the diaphragm are time consuming and expensive. According to one practice of this process: a cavity is formed in the top surface layer of a substrate, an oxide spacer is deposited in the cavity, and a semiconductor layer is applied over the oxide spacer. Thereafter, the oxide spacer is etched from the reverse or backside of the substrate to define a diaphragm that is free-standing over the cavity, i.e., the diaphragm spans across the cavity. This back-side etching process requires numerous processing steps and is relatively complex and costly. Furthermore, difficulties in maintaining the processing steps within the required tolerances create difficulties in forming high yields of semiconductor pressure sensors over time.

Therefore, it is an object of this invention to provide a differential pressure sensor which can be manufactured in a cost effective manner with a relatively high yield of acceptable sensors.

An additional object of the invention is to produce a compact pressure sensor that uses only a single semiconductor layer and that does not require alignment between a plurality of layers.

It is a further object of the invention to provide a pressure sensor capable of measuring the differential between two distinct fluid pressures applied to the same side of the pressure sensor.

Other general and specific objects of this invention will be apparent and evident from the accompanying drawings and the following description.

SUMMARY OF THE INVENTION

The invention achieves the foregoing and other objects with a differential pressure sensor having cavity structures formed on only one side of a semiconductor substrate. The differential pressure sensor according to the invention has a pressure passage extending from a top side to the underside of a polysilicon diaphragm formed on the semiconductor substrate. The term polysilicon as used herein refers to polycrystalline silicon.

In one embodiment, the sensor is formed of a silicon substrate, a polysilicon diaphragm fixed on the substrate, and an electrical element for sensing deflection of the diaphragm. A cavity is recessed in one surface of the substrate, and the polysilicon diaphragm spans the cavity. A first pressure port mounts with the substrate and is disposed for receiving a first fluid pressure from a first direction along a first axis and a pressure passage extends through the diaphragm to apply to the cavity the first fluid pressure available from the first pressure port. A second pressure port also mounts with the substrate and is disposed for receiving a second fluid pressure from the first direction. The second pressure port is formed to cause the second fluid pressure to act upon the top face of the diaphragm that spans the cavity. The electrical detection element senses the deflection of the diaphragm resulting from a pressure difference between the first and second fluid pressures acting on different faces of the diaphragm and provides an output signal responsive to that pressure difference.

Conventional semiconductor pressure sensors for differential pressure measurement are double-sided structures having at least one pressure port on each side of a sensor chip. In comparison, this invention provides a differential pressure sensor having pressure ports on only one side of a sensor chip. The one-sided pressure sensing structure facilitates both the chip fabrication and the sensor packaging. Hence, one advantage of the invention is the potential for the low-cost production of differential pressure sensors useful, for example, for heating, ventilating and air-conditioning systems, and for medical monitors and instruments.

In an alternative embodiment of the invention, the pressure sensor is formed of a substrate having a cavity and a channel recessed on the substrate, a polysilicon diaphragm spanning the cavity, and an electrical element for sensing deflection of the diaphragm. A pressure passage is formed by the polysilicon diaphragm covering the channel recessed in the substrate. The pressure passage extends from the cavity and through the substrate, rather than extending from the cavity and through a hole in the diaphragm. A first port mounts with the substrate and is positioned for receiving a first fluid pressure from a first direction along a first axis, and the pressure passage extends through the substrate towards the recessed cavity to apply to the cavity the first fluid pressure. A second port mounts with the substrate and receives a second fluid pressure from the first direction. The second port directs the second fluid pressure to the portion of the top face of the diaphragm that spans the cavity. This pressure sensor thus allows first and second fluid pressures that are applied to one side of the pressure sensor to be applied in a differential manner across the polysilicon diaphragm of the pressure sensor.

Other aspects of the invention provide a housing enclosing the substrate and diaphragm structure. In accordance with this aspect, the housing generally provides a selectively-ported airtight structure surrounding the substrate and diaphragm structure. The housing can include structural elements that direct the first fluid pressure toward the pressure passage, and that direct the second fluid pressure toward a portion of the diaphragm spaced from, i.e. distal to, the pressure passage.

The housing can include a carrier and a cap. In this instance, the sensing chip, which includes the substrate and diaphragm structure, is mounted to the carrier and the cap is secured to the carrier to form an enclosure surrounding the substrate and the diaphragm structure. The cap can have a first vent for directing a first fluid pressure to a specified location on the substrate and diaphragm structure. The cap can have a second vent for directing a second fluid pressure to a second specified location on the substrate and diaphragm structure. The housing can include a divider to separate volumetric spaces receiving the first and the second fluid pressures. In particular, the divider can partition the interior of the housing into two selectively isolated pressure chambers that are accessible selectively from the vents in the cap. As a result, one pressure chamber communicates pressure-wise with the pressure passage and the other chamber is substantially isolated pressure-wise from the pressure passage.

As an alternative to providing a separate divider element that provides a selected pressure seal or barrier between the two spaces or chambers within the housing, a structure can be provided that imposes a relatively high pneumatic impedance between the two spaces. This pneumatic impedance in effect divides space within the housing into two chambers that are pneumatically isolated from each other.

One method of the invention for constructing a pressure sensor includes forming a cavity in a semiconductor substrate. The cavity can be formed with a predetermined depth and shape to function as an overrange pressure stop. After the cavity is formed, an oxide spacer is added to the cavity to act as a sacrificial layer. Thereafter, a diaphragm is deposited over the oxide spacer. The oxide spacer is removed by way of a front surface of the substrate, and the remaining opening in the substrate is sealed as a vacuum cavity. Sensing elements and metal contacts are then formed on the diaphragm. In one embodiment of the invention, a pressure passage is etched through the diaphragm from the front surface of the pressure sensor to the cavity, for creating a pathway for applying pressure from the front surface of the substrate to the bottom or back surface of the diaphragm.

This manufacturing method is free of many of the disadvantages associated with conventional backside-etch processes. Rather, the method of this invention utilizes a readily controlled manufacturing process that produces a high yield of acceptable pressure sensors.

According to additional aspects of the invention, a sensor chip forming the substrate and diaphragm structure is positioned on a carrier, and the contact pads of a set of one or more sensing elements on the chip are wire bonded to metalized electrical contacts formed on the perimeter of the carrier. The electrical contacts are coupled to connector leads on the bottom or other exterior surface of the carrier, to provide external connections to the sensing element set from other electronic instrumentation.

A cap containing dual pressure passages can be secured to the carrier. The cap can include two ports for directing fluid pressures to particular locations on the substrate and diaphragm structure. For instance, one port preferably directs a first fluid pressure to an area near the pressure passage, and another port preferably directs a second fluid pressure to an area spaced from the pressure passage.

Further aspects of the method of the invention include providing a relatively high pneumatic impedance within the housing, at pneumatic frequencies of interest, and between the foregoing two areas. In one practice, this includes installing a divider in the housing to form at least two distinct pressure chambers within the housing, for applying a different external pressure to each surface of the diaphragm. Preferably, the first pressure chamber formed with the divider couples a first pressure, applied through one pressure port, to the top surface of the diaphragm; and the second pressure chamber couples a second pressure, applied to another pressure port, to the back surface of the diaphragm. The diaphragm then deflects due to the resultant differential pressure exerted on it, and the set of sensing elements produces an electrical output signal representative of the flexing of the diaphragm.

BRIEF DESCRIPTION OF THE DRAWINGS

The foregoing and other objects, features and advantages of the invention will be apparent from the following description of preferred embodiments, as illustrated in the accompanying drawings in which like reference characters refer to the same elements throughout the different views. The drawings are not necessarily drawn to scale, emphasis being placed on illustrating principles of the invention.

DESCRIPTION OF ILLUSTRATED EMBODIMENTS

Figure 1:
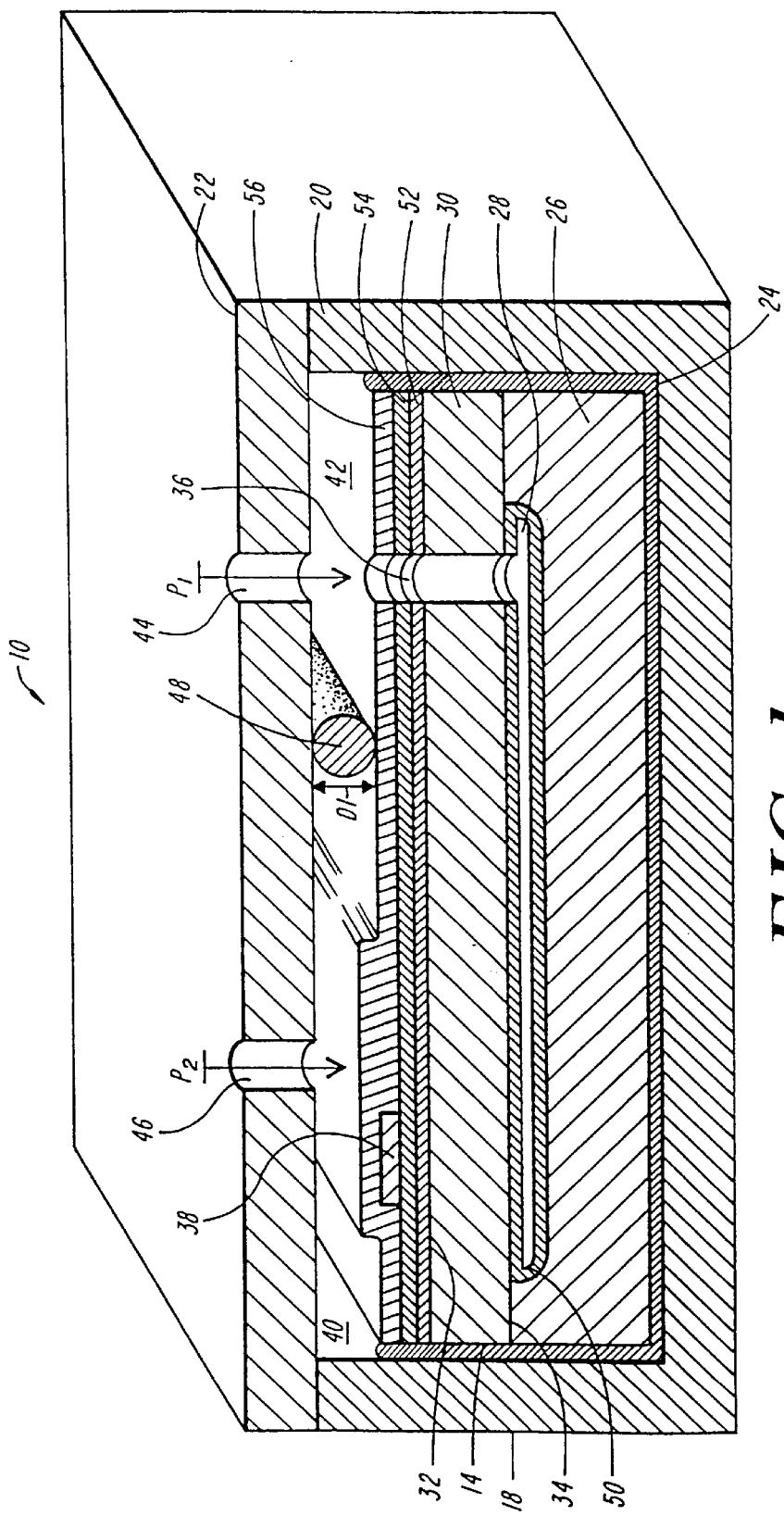
FIG. 1 is a cut-away view of a semiconductor sensor according to the invention.

FIG. 1 shows a differential pressure sensor 10 according to the invention for detecting the pressure differential between a first fluid pressure P1 and a second fluid pressure P2. The pressure sensor 10 has a semiconductor chip 14 contained within a housing 18. The chip 14 is formed by a process described below. The housing 18 has a carrier 20 and a cap 22 that together fully enclose the chip 14. Preferably, an adhesive 24 mounts the chip 14 to the carrier 20. The adhesive 24 is located between the bottom of chip 14 and the housing 18, and the adhesive can be squeezed up between the sides of chip and the housing. The cap 22 has two openings for applying the pressures P1 and P2 to the chip 14. The illustrated sensor 10 advantageously is capable of receiving the external pressures P1 and P2 at the same side of the housing 18.

The chip 14 is formed of a substrate 26 having opposed top and bottom surfaces. The substrate 26 is preferably formed of semiconductor material, such as silicon. The top surface of the substrate 26 is recessed by a cavity 28. A diaphragm 30, having a top face 32 and a bottom face 34, is bonded or otherwise secured to the top surface of the substrate 26 and spans across the cavity 28 such that the diaphragm 30 is coupled pressure-wise with the hollow cavity 28. The diaphragm preferably is formed of a polycrystalline silicon material, i.e., a polysilicon material, that is deposited over the substrate 26.

A pressure passage 36 extends through the diaphragm from the top face 32 to the bottom face 34. The pressure passage 36 communicates a first fluid pressure, applied to the top face of the diaphragm, pressure-wise to the cavity 28. Accordingly, a first fluid pressure acting upon the pressure passage 36 communicates with the cavity 28, and thereby acts upon the bottom face 34 of the diaphragm that spans the cavity 28.

The chip 14 has a sensing element 38 mounted to the top face 32 of the diaphragm 30. The illustrated chip 14 has electrically-insulating layers 52 and 54 interposed between the top of the diaphragm 30 and the sensing element 38, as shown. The sensing element responds to diaphragm deflection, typically by altering electrical characteristics in proportion to the magnitude of the diaphragm deflection. The sensing element 38 is generally formed of one or more segments of conductive film which form capacitor plates or piezoresistors.

In operation, the two fluid pressures P1 and P2 of interest are applied to the top of pressure sensor 10. The second fluid pressure P2 is applied to a portion of the pressure sensor distant from the pressure passage 36, such that pressure P2 acts on the top face 32 of the diaphragm 30 in an area spanning cavity 28. The first fluid pressure P1 is applied to the pressure sensor at an area near the pressure passage 36, and hence, by way of the passage, acts on the bottom surface 34 of the diaphragm 30. In particular, pressure P1 communicates with cavity 28 through passage 36, to exert a force on the bottom surface 34 of the diaphragm from inside of cavity 28. A resultant force proportional to the difference between the first fluid pressure P1 and the second fluid pressure P2 is thus applied across the diaphragm 30. The diaphragm 30 flexes in response to the resultant force, and the sensing element 38 detects the resultant flexing of the diaphragm and produces an output signal in response.

With further reference to FIG. 1, the illustrated sensor 10 has, within the housing 18, a chamber 40 distal from the pressure passage 36, and a chamber 42 proximal to the pressure passage 36. The chamber 40 represents a volume of space within the pressure sensor 10 and that has a pressure determined by and hence at least primarily responsive to the applied second fluid pressure P2. Similarly, the chamber 42 represents a volume of space within the pressure sensor 10 and that has a pressure determined by and at least primarily responsive to the first fluid pressure P1. According to one feature of the invention, a variety of structural arrangements can be used to prevent the fluid pressures P1 and P2 from substantially intermixing within the sensor housing 18.

In accordance with another aspect, a connecting tube (not shown) can be provided to apply the applied first fluid pressure P1 directly to the pressure passage 36, rather than to the chamber 42. Further in accord with the invention, the top face 34 of the diaphragm 30 can remain open to a surrounding fluid pressure P2. This structure thus allows two distinct fluid pressures to be applied across the diaphragm from the same side of the pressure sensor 10.

A preferred embodiment of the invention, as illustrated in FIG. 1, includes a cap 14 apertured with a first opening 44 and a second opening 46. The first opening 44 provides a passageway through the cap 22 for the first applied pressure P1, and the second opening 46 provides a passageway through the cap 22 for the second applied pressure P2. The cap is positioned relative to the chip 14 to locate the first opening proximal to the passageway 36, and to locate the second opening 46 distal to the passageway 36. With the cap 14 positioned in this manner, the first and second fluid pressures remain substantially distinct, and exert a differential pressure across the diaphragm 30.

As further illustrated in FIG. 1, the pressure sensor 10 can include a barrier or divider 48 spanning the gap between the cap 22 and the chip 14 in a manner to ensure that the chambers 40 and 42 are substantially isolated pressure-wise. In the illustrated embodiment, the divider 48, in conjunction with the chip 14 and the cap 22, physically divides the space between the cap 22 and the chip 14 into a distal chamber 40 and a proximal chamber 42. The proximal chamber 42 communicates with the first opening 44 through which fluid pressure P1 is applied, and the distal chamber 40 communicates with the second opening 46 through which the applied pressure P2 is applied.

The divider 48 can form a hermetic, pressure-tight seal between the chip 14 and the cap 22. The divider 48 enhances the accuracy of the differential pressure sensor 10 by ensuring that the first applied pressure P1 only exerts a force on the bottom face 34 of the diaphragm, and by ensuring that the second applied pressure P2 only exerts a force on the top face 32 of the diaphragm. The divider 48 can be formed of a polymeric sealing material such as silicone rubber, dispensed on the surface of the sensor chip. Alternatively, the sealing material can also be dispensed on the inner side of the cap 22 before the cap is placed on the housing.

In accordance with another aspect of the invention, the surface of the substrate 26 that forms the bottom of the cavity 28 functions as a forward, overrange pressure stop to prevent damage to the diaphragm when excess pressure is applied to the top side of the diaphragm 30. The depth and the shape of the cavity 28 determine the distance which the diaphragm 30 can deflect before reaching and being stopped by the substrate 26. In addition, the innermost surface of the cavity 28, which abuts the diaphragm 30 upon excessive pressure in the chamber 40, is preferably coated with a layer of a release material 50. The release material 50 preferably is silicon dioxide or silicon nitride, and prevents the diaphragm from sticking to the pressure stop during such an overpressure condition.

With continued reference to FIG. 1, various layers of dielectric material can be provided between the diaphragm 30 and the sensing element 38 to isolate the sensing element 38 electrically from the diaphragm 30. Such layers also can isolate different segments of the sensing element from each other. One or more additional electrically-isolating layers, such as silicon nitride, can be formed over the sensing element 38 to isolate the sensing element 38 electrically and to protect the sensing element from detrimental environmental factors. For example, FIG. 1 illustrates a silicon dioxide layer 52 under a silicon nitride layer 54, and both spanning the diaphragm 30 to isolate each segment of the sensing element 38 electrically from the diaphragm 30.

The insulating layers 52 and 54 have dielectric characteristics that isolate sensing element segments from each other and from the diaphragm 30, and yet that maintain high mechanical coupling of the sensing element with the diaphragm. Electrical isolation of the sensing element 38 advantageously allows the pressure sensor 10 to operate at temperatures as high as 200 degrees Centigrade without experiencing significant degradation of its pressure sensing capabilities.

Figure 2:
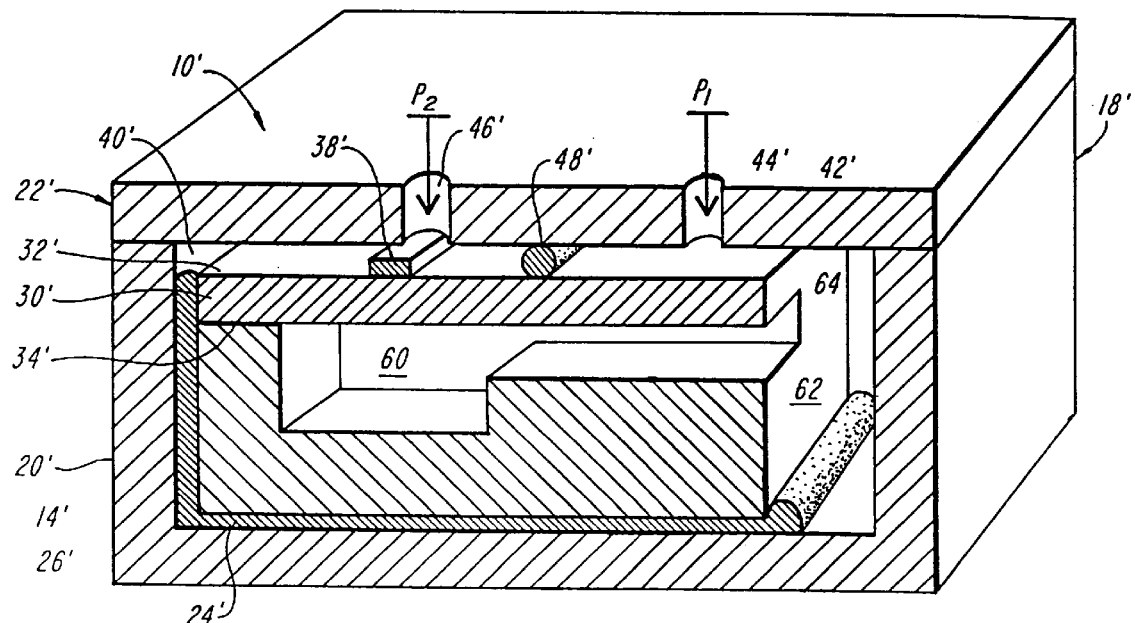
FIG. 2 is a view similar to FIG. 1 of another semiconductor sensor according to the invention.

FIG. 2 shows a pressure sensor 10' according to another embodiment of the invention. The pressure sensor 10' includes a chip 14' contained within a housing 18'. The chip 14' is formed by a process detailed hereafter. A carrier 20' and a cap 22' form a chip housing 18', and the cap 22' is apertured with two openings for applying pressures P1 and P2 to the chip 14'.

The chip 14' is formed of a silicon substrate 26' having opposed top and bottom surfaces. The top surface is recessed depth-wise with a first cavity 60 and is recessed with a channel 64. The channel 64 extends from cavity 60 to a first surface 62 of the substrate. A diaphragm 30', having a top face 32' and a bottom face 34', is secured on the unrecessed top surface of the substrate 26'. The diaphragm 30' spans the first cavity 60 and the channel 64, thereby forming a pressure passage interconnecting pressure-wise the cavity 60 with the first surface 62. The chip 14' is positioned and mounted within the housing 18' such that the portion of channel 64 opening on surface 62 remains unobstructed. For instance, FIG. 2 illustrates surface 62 of the chip 14' as being spaced from the interior surface of carrier 20', thereby forming an unobstructed space. The adhesive 24' secures chip 14' to the carrier 20', but the adhesive 24' does not cover the opening in surface 62 which leads to channel 64 and cavity 60. The space between the substrate surface 62 and the walls of the carrier 20' is large enough to prevent the adhesive 24' from running up surface 62 and obstructing channel 64 when the chip 14' is mounted to the carrier 20'.

A sensing element 38', which senses and transforms the deflection of the diaphragm 30' into electrical signals, is secured to the top face of the diaphragm 30'. The sensing element 38' is generally one or more segments of an electrical element, e.g. formed of one or more conductive films. The set of one or more segments operates as one or more plates of a capacitor or, preferably, as one or more piezoresistors.

At least one of the first and second openings 44', 46' through the cap 22' directs the first pressure P1 to the first cavity 60 and at least one other opening directs the second pressure P2 against a first portion of the diaphragm 30' which spans the first cavity 60. For example, pressure P1 communicates pressure-wise with the chamber 42', chamber 42' being bounded by the cap 22', a divider 48', the diaphragm 30', the substrate surface 62 and the carrier 20. Pressure P1 also communicates pressure-wise with cavity 60 through the pressure passage formed by the channel 64. Accordingly, the applied pressure P1 exerts a force on the bottom surface of the diaphragm 30' from within the first cavity 60. The diaphragm 30' flexes in response to the resultant force generated by the pressure difference between fluid pressure P1 and fluid pressure P2, and the sensing element 38' produce an electrical output signal responsive to the diaphragm deflection.

With further reference to FIG. 2, the illustrated cap 22' has a first opening 44' and a second opening 46'. The opening 44' provides a passageway through the cap 22' for the first applied pressure P1, and the opening 46' provides a passageway through the cap 22' for the second applied pressure P2. A preferred embodiment of the pressure sensor 10' includes, as shown in FIG. 2, a polymeric divider 48' spanning the gap between one or more inner surfaces of the housing 18' and the chip 14'. The divider 48' forms two pressure chambers 40' and 42' that effectively separate the two applied pressures P1 and P2 from one another within the housing 18'. In particular, the illustrated divider 48' is structured to form a pressure seal, between the chip 14' and the cap 22', which retards the first applied pressure P1 from mixing with the second applied pressure P2.

Figure 3:
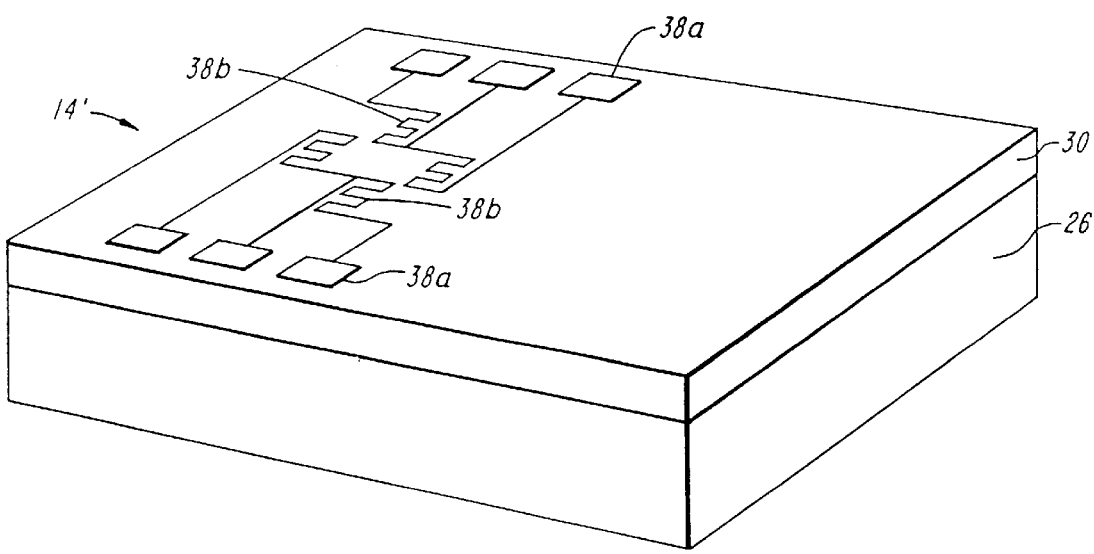
FIG. 3 is a perspective view of a sensor chip as shown in FIGS. 1 or 2.

FIG. 3, which shows a sensor chip 14 or 14' as in FIGS. 1 or 2, illustrates a preferred sensing element 38/38' that has electrical segments 38b, preferably piezoresistors, positioned on the surface of the diaphragm 30/30'. The electrical segments 38b are responsive to diaphragm deflection and are electrically connected to contacts 38a. The illustrated contacts 38a are positioned near an edge of the chip 14/14' and are formed of a metallic conductive material, preferably aluminum. In operation, at least one electrical characteristic of the sensing segments 38b changes in response to the magnitude of the deflection of the diaphragm of the chip 14/14'. The change in the piezoresistive segments 38b can be sensed by, for example, connecting the segments 38b into a wheatstone bridge configuration with segments 38a.

Processing steps to fabricate the differential pressure sensors 10 and 10' in accord with the invention are now described, starting with particular reference to the sensor 10 of FIG. 1. Overall, the single-sided differential pressure sensor is formed by depositing diaphragm material onto a substrate 26 and spanning over a cavity 28 filled with a sacrificial material; the cavity recesses a top surface of the substrate 26. The sacrificial material is then removed to create a free span of the diaphragm over the cavity space. In one embodiment, a pressure passage 36 is formed through the diaphragm to couple an applied pressure to the cavity and hence to the bottom side of the diaphragm, in an alternative embodiment, a recessed channel formed in the substrate acts as a pressure passage. According to a preferred practice of the invention, the cavity area is defined initially as an oxide spacer which is grown into the substrate surface. The bottom face of the diaphragm layer, later deposited, is substantially coplanar with the upper substrate surface that is not part of the cavity.

Figure 4:
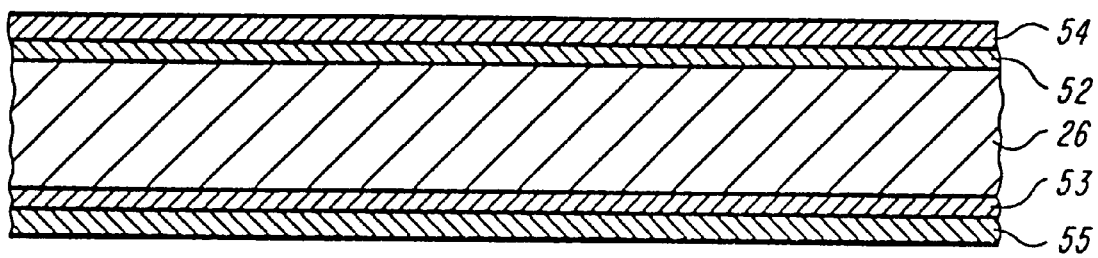
FIGS. 4–14 are cross-sectional views taken along section line 4-14 of FIG. 3 and illustrating successive process steps for forming the sensor of FIG. 1.

With reference to FIG. 4, in one preferred practice of the invention, a preferred starting material for the substrate 26 can be a single crystal silicon wafer. A 400 angstrom thick layer of silicon dioxide 52 is thermally grown on the top surface of the wafer. A second layer, of low-stress and low-pressure chemical vapor deposited (LPCVD) silicon nitride 54, about 900 angstroms thick, is deposited over the layer 52. In one practice, the silicon nitride is deposited from a gas phase comprising a 5 to 1 or 6 to 1 ratio mixture of dichlorosilane gas and ammonia. As exemplary conditions, the ammonia gas is provided at a flow rate of nine milliliters per minute and the dichlorosilane at a flow rate of fifty-four milliliters per minute, at a pressure of approximately 150 milliTorr and a deposition temperature of 800° C. Similar layers of silicon dioxide 53 and of silicon nitride 55 can be formed on the bottom surface of the wafer, using the same processes identified above.

After the substrate-forming silicon wafer is prepared as shown in FIG. 4, a layer of photoresist is applied to the top of the substrate. Using photolithography, the photoresist is patterned to expose the silicon nitride 54 in the desired area for cavity 28. Cavity 28 is representative of the areas necessary to form the cavity 28 of FIG. 1, and the cavity 60 and channel 64 of FIG. 2. That is, the steps used to form cavity 28 as described herein are analogous to the steps required to form the cavity 60 and channel 64.

Figure 5:
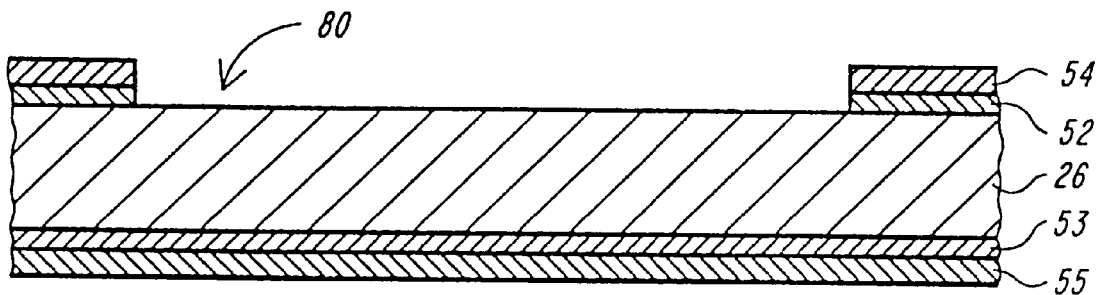

FIG. 5 shows the exposed nitride layer being etched away in a $CF_4/O_2$ plasma, followed by a HF etch of the oxide layer 52 to form an open area 80 that defines the perimeter of the cavity.

Figure 6:
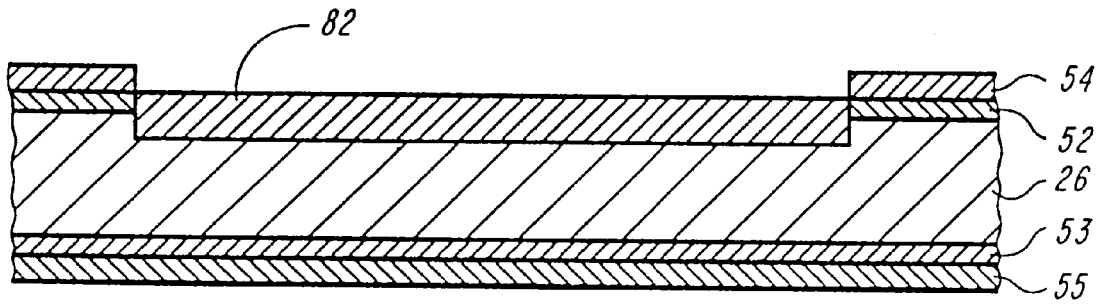
Figure 7:
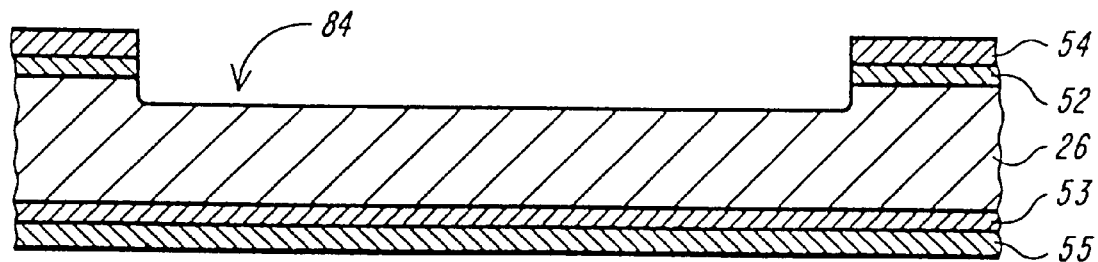

The substrate is then oxidized at, e.g. 1050° C., under wet oxygen to form a 7500 angstrom thick layer 82 of silicon dioxide, which partially defines the cavity 28, as shown in FIG. 6. The entire substrate is then immersed in a HF solution to remove the dioxide layer 82, leaving an indentation 84 that recesses the substrate top surface, as shown in FIG. 7.

Figure 8:
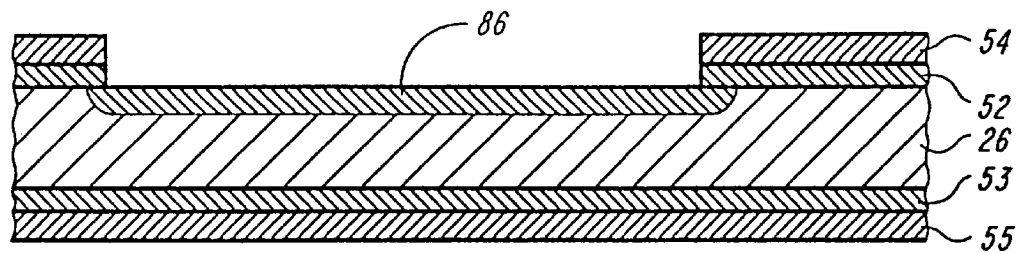

As illustrated in FIG. 8, the substrate is then reoxidized under the same conditions as described above to grow a silicon dioxide spacer 86 in the indentation 84. The result is an oxide-filled area approximately 7500 angstroms thick, which has a top surface substantially level with the top surface of the substrate. The nitride layer 54 is an effective oxidation barrier, oxidizing at less than one angstrom a minute at a temperature of 1050° C.

Figure 9:
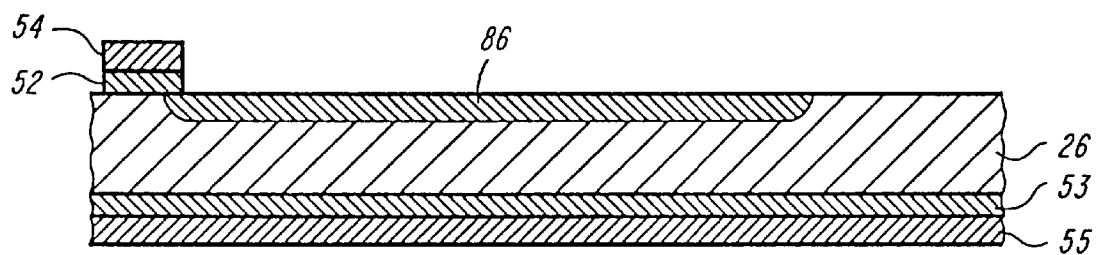

A patterned photoresist is then used as a masking layer to etch open sections of the top nitride/oxide layers 54 and 52, as shown in FIG. 9. The open sections expose the silicon wafer at places where the sensing diaphragm is to be anchored to the wafer material.

The next phase of the process involves etching the oxide spacer 86, preparatory to forming the cavity 28. This step typically utilizes the so-called punch through approach. In particular, the remaining oxide/nitride layers 52, 54 on the top of the wafer are patterned to form a network of channels to accept an etchant to dissolve the oxide spacer 86.

Figure 10:
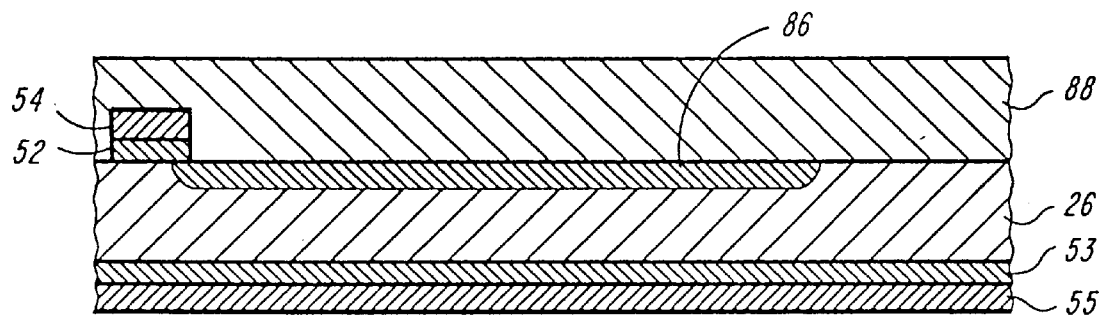

The diaphragm 30 of the sensor 10 (FIG. 1) is formed, as FIG. 10 shows, by depositing a layer of LPCVD polycrystalline silicon (or polysilicon) 88, e.g. two micrometers thick, on the silicon substrate 26, with a portion of the polysilicon layer overlying the oxide spacer 86. Such a two micron thick layer of polysilicon can, for example, be deposited from silane gas at 580° C. at 300 milliTorr for 340 minutes and then annealed at 1150° C. for 180 minutes to reduce residual strains.

Figure 11:
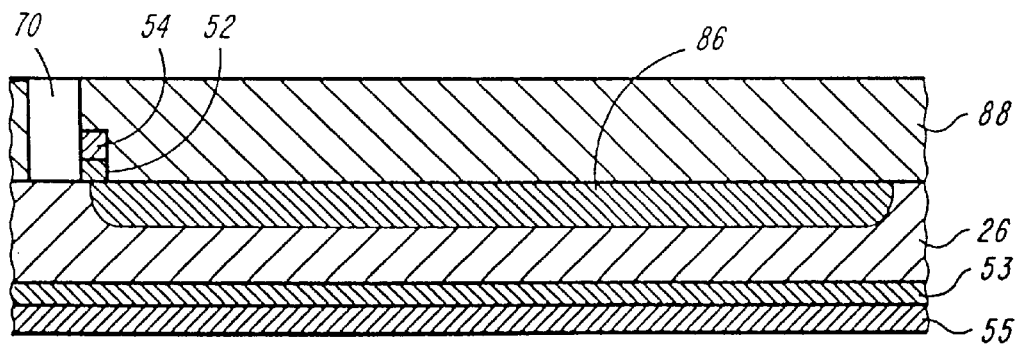

The next step, as illustrated in FIG. 11, involves forming trench wells 70. The trench wells 70 are essentially cuts in the polysilicon layer 88 which permit an etchant to enter the network of channels to dissolve the oxide spacer and thereby to form the hollow cavity 28. To form the trench wells 70, a layer of photoresist (not shown) is applied over the polysilicon layer 88 and subjected to a selected pattern of exposure. The exposed polysilicon is etched in a $CF_4/O_2$ plasma or by reactive ion etching until the underlying nitride/oxide channel region is exposed. This is followed by an HF etch of the exposed nitride layer 54 and of the oxide layer 52, to form the desired trench well 70.

Figure 12:
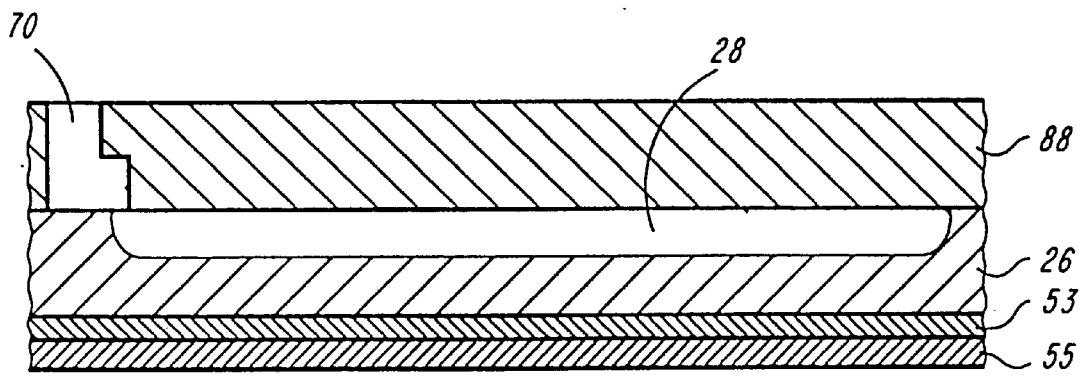

As shown in FIG. 12, the substrate is next immersed in an HF etchant, which enters through the trench well 70 to start etching the channels and work its way to etch away the oxide spacer 86. A typical duration of this etch process is twenty hours, depending on the span of the diaphragm. Afterward, the substrate is rinsed thoroughly in water.

Figure 13:
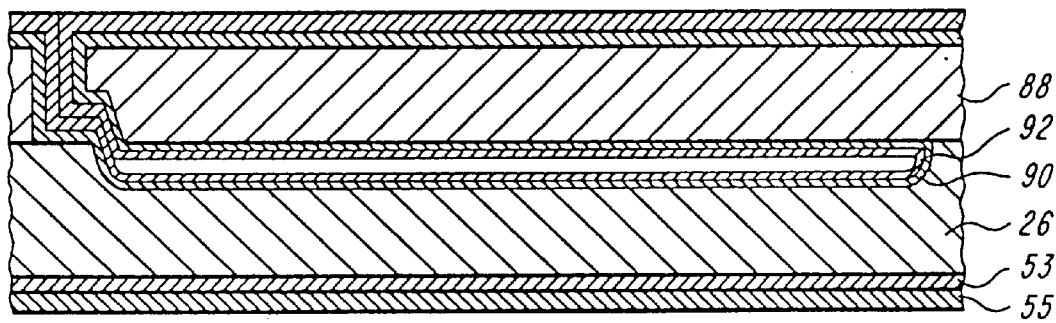

Next, as illustrated in FIG. 13, a layer of silicon dioxide 90 is grown within the cavity and over the diaphragm, typically to 500 angstroms thick, followed by the growth of a layer of LPCVD silicon nitride 92, also typically 900 angstroms thick. The desired low stress nitride layer can be achieved by using large ratios of dichlorosilane to ammonia. The nitride layer 92 serves as dielectric isolation upon which the sensing element 38 is applied. Also, the two layers 90 and 92 seal the cavity 28 closed at the trench walls 70, because the open channels, which typically are approximately 1400 angstroms high, are completely plugged by the growth of the oxide and the nitride layers 90, 92. The residual reactive gases trapped inside the cavity 28 continue to react until essentially a vacuum is left in the cavity. Furthermore, this coating of oxide/nitride formed inside the cavity retards the diaphragm from sticking to the surface area of the cavity, in the event of overpressure deflection.

Figure 14:
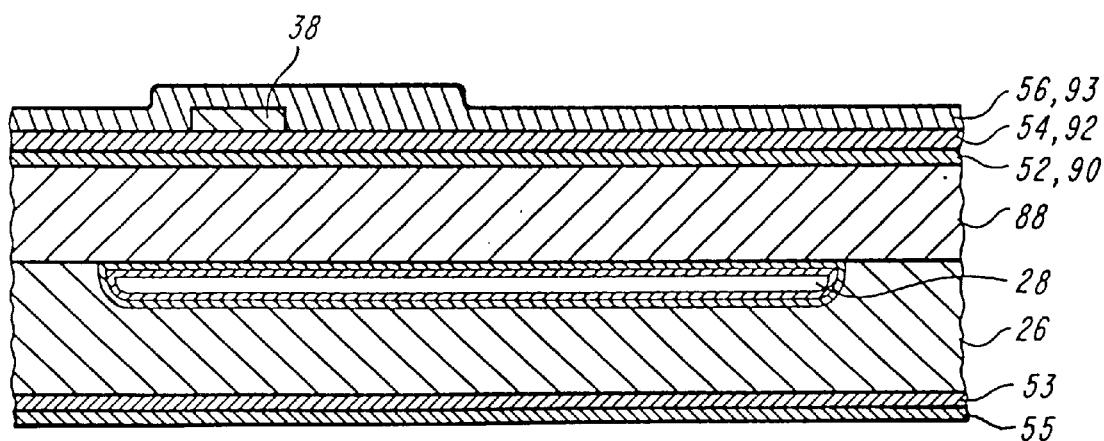

Upon completion of the formation of the cavity and of the oxide and nitride layers 90 and 92 as shown in FIG. 13, a sensing element 38 having a set of sensing segments 38b (FIG. 3) and associated electrical contact pads 38a can be formed, as illustrated in FIG. 14. The sensing element is, in one example, formed by depositing a layer of piezoresistive material, typically with a LPCVD polysilicon deposition system, onto the silicon nitride 92 that forms the layer 54, FIG. 1. In one preferred embodiment, illustrated in FIG. 3, four serpentine-like resistive segments are located symmetrically on the diaphragm and connected electrically in series to provide high pressure sensitivity and an optimal matching of resistors from diaphragm to diaphragm, i.e. from one chip 14 to another. Other resistor configurations can also be used. One preferred method of forming these segments of the 38b sensing element 38, and their associated pads 38a, is discussed fully in Fung, U.S. Pat. No. 5,220, 838, that is incorporated herein by reference.

As also shown in FIG. 14, a silicon nitride layer 93, that forms the protective layer 56, FIG. 1, is formed on the substrate after formation of the set 38 of sensing segments 33b and of contact pads 38a, preferably in the manner described above for the formation of the silicon nitride layer 92.

Figure 15:
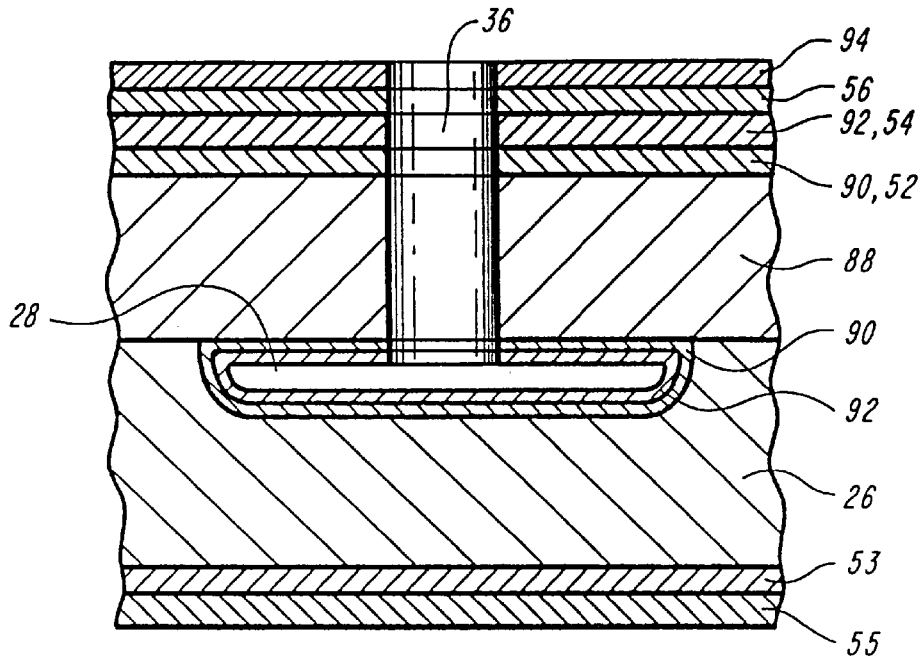
FIGS. 15 and 16 are cross-sectional views taken along section line 15-16 of FIG. 3 and illustrating successive process steps for forming a pressure passage in the sensor of FIG. 1.
Figure 16:
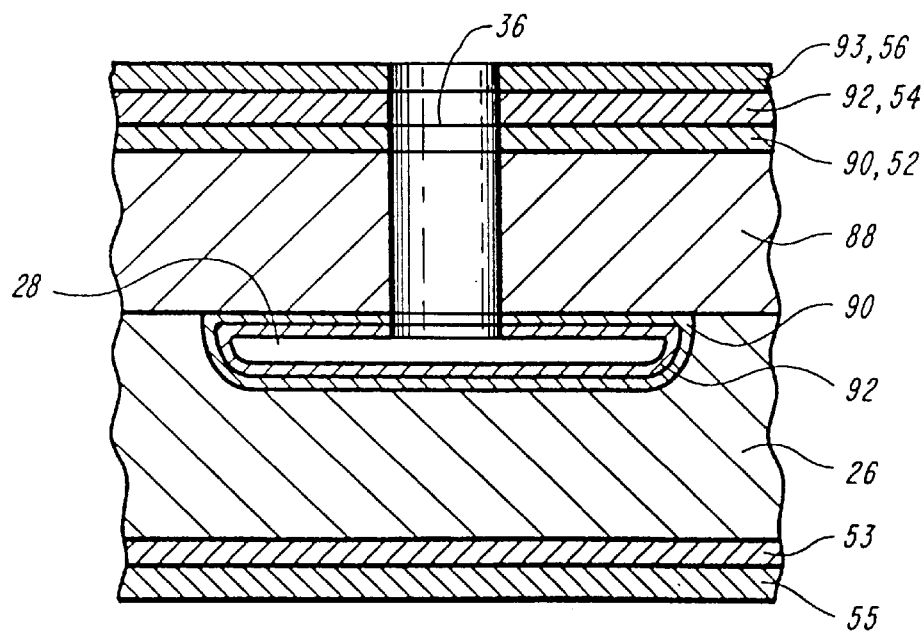

FIGS. 15 and 16 illustrate the steps of forming the pressure passage 36 of the sensor 10. A photoresist mask layer 94 is applied over the protective silicon nitride layer 93 and is exposed in a pattern representative of the desired location of the pressure passage 36. Using plasma or reactive ion etching, the nitride layers 92 and 93 and the oxide layer 90 and the polysilicon layer 88 are successively etched away in the area defined by the exposed mask layer 94. The etching process continues until it defines the desired pressure passage 36. FIG. 16 illustrates the result of the removal of the photoresist layer 94, typically by using an oxygen plasma. The resultant structure is the sensing chip 14 with the desired substrate and diaphragm structure of FIG. 1.

The steps for forming the pressure passage of the sensor 10' of FIG. 2 differ from the steps described in FIGS. 15 and 16. The chip 14' does not include a pressure passage through the diaphragm, rather the pressure passage shown in FIG. 2 is formed of a channel 64 opening on the first surface 62 of the substrate. The channel 64 is produced using the methods described in FIGS. 4–9.

Generally, many pressure sensing chips are mass produced on a large silicon wafer and the wafer is diced into individual pressure sensing chips. Accordingly, the pressure passage shown in FIG. 2 can be formed by cutting through the channel 64 of the chip 14' while dicing a large silicon wafter into individual sensing chips. Alternatively, the pressure passage can be formed entirely during the semiconductor manufacturing process illustrated in FIGS. 4–14. In particular, the channel can be etched into the pressure sensing chip such that it extends from the cavity 60 to the surface 62 of the chip.

Figure 17:
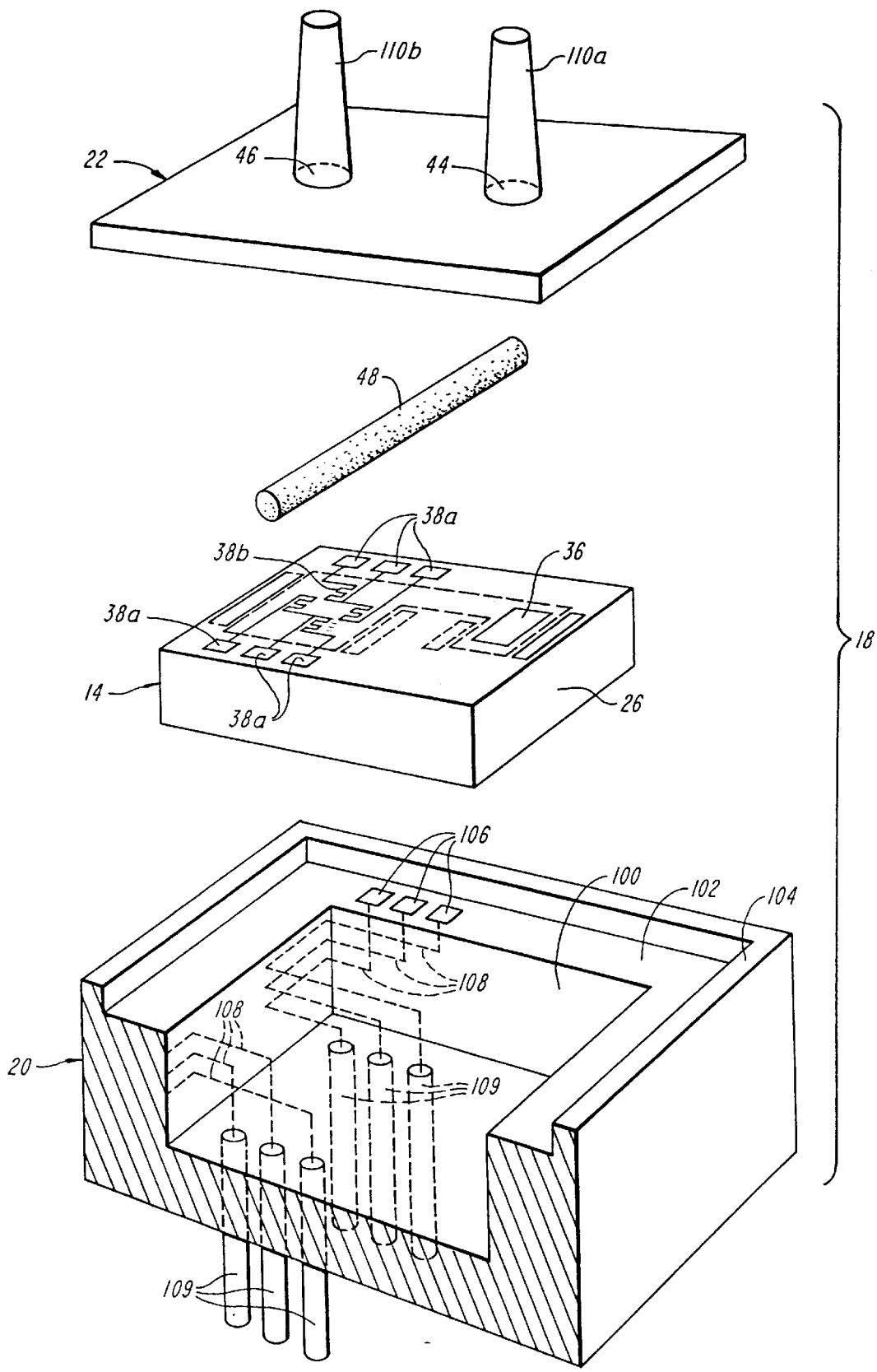
FIG. 17 is an exploded view, partially fragmentary, of a differential pressure sensor including the chip of FIG. 2.
Figure 18:
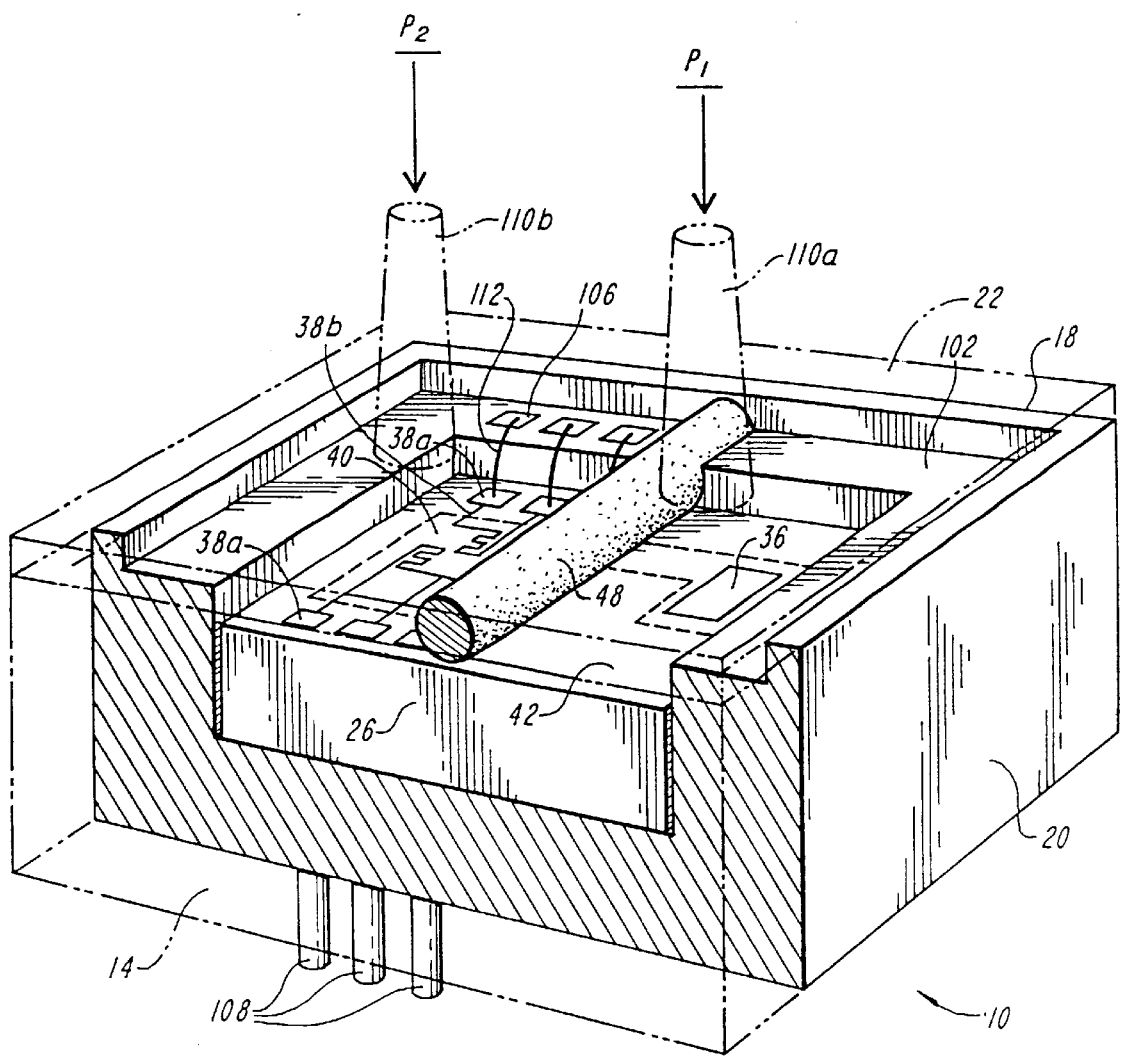
FIG. 18 is a perspective view, partly cut away and partly in phantom, of the fully assembled differential pressure sensor of FIG. 17.

FIGS. 17 and 18 show the mounting of the complete pressure sensing chip 14 in the housing 18. The carrier 20 of housing 18 includes a housing cavity 100 that is structured to accept and align the chip 14. The carrier 20 and the cap 22 preferably are formed from ceramic materials, such as alumina, conventionally used in semiconductor integrated circuit manufacturing. An example is available from Coors Electronics Package Company, Chattanooga, Tenn. and is designated 92% alumina ceramic. Alternatively, the carrier 20 and the cap 22 can be formed of materials that are substantially electrically inert, such as magnesium oxide, ceramic refractory, silica, and polymers including plastics, thermoplastics, and resins.

The steps of assembling the pressure sensor chip 14 in the housing 18 are also shown in FIGS. 17 and 18. Adhesive 24, as shown in FIG. 1, is applied to the walls forming cavity 100 or to the bottom surface of chip 14. The adhesive is applied in sufficient quantity so that when the chip is mounted within the cavity the adhesive 24 is sandwiched between the bottom of chip 14 and the carrier 20 and the adhesive 24 is squeezed up along the sides of the chip 14. The adhesive may be forced up along the sides of the chip 14 until it is about level with the top surface of chip 14. Current designs suggest that excess adhesive running over onto the top of chip 14 causes no damage or operational deficiencies.

The divider 48 is typically formed after mounting chip 14 with adhesive 24 to the carrier 20. The divider 48 is a bead of viscous material dispensed on the surface of the sensor chip 14 or on the cap 22. The bead of viscous material extends the distance across the chip 14, thereby dividing cavity 100 into two separate cavities 40 and 42 located above the top surface of chip 14.

After the chip 14 is positioned within the carrier 20 and secured in place, e.g., using adhesive 24, electrical connections are made as discussed below. Following which the cap 22 is mounted to the carrier 20. Preferably, an adhesive is placed on the abutting surfaces of cap 22 and carrier 20 to form an air-tight seal.

The open top of the carrier 20 can include a ledge 102, FIG. 17, recessed from a top surface 104. The illustrated ledge is formed into each wall of the carrier 20, and hence follows the perimeter of the top surface 104. Electrical pads 106 are located on the ledge 102. The pads are formed of an electrically conductive material, preferably a metal such as gold. Electrical conductive paths 108 extend within the carrier 20, between the pads 106 and external contact pins 109 that project outwardly from the carrier. The conductive paths 108 can be formed as metalization path through the carrier 20 or they can be formed by conductive leads extending within the carrier 20. The pads 106 and the respective conductive paths 108 and external pins 109 provide for electrical connection by way of wire bonds 112 (FIG. 18), to the contact pads 38a on the chip 14 sealed within the carrier 20. The ledge is located below the top surface of the carrier sufficiently to allow the cap 22 to be attached to the top surface 104 of the carrier 20 in a manner that does not interfere with conductive wires 112 bonded between contacts 38a on the sensor chip and the pads 106.

With further reference to FIG. 17, the illustrated cap 22 includes ports 110a and 110b that provide pathways for applying external pressures to the chip 14. Each port can be formed in various shapes, include truncated cones or tubes, and is generally formed of a substantially gas impermeable material such as a polymer, plastic, or resin. The ports 110a, 110b are located directly over the first opening 44 and the second opening 46 in the cap, respectively. In this configuration, a first pressure P1 applied to port 110a is directed to the portion of chip 14 proximal to passageway 36, and a second pressure P2 applied to port 110b is directed to a position distal to passageway 36.

FIG. 18 shows divider 48 sealed within the housing 18 between the two pressure chambers 40 and 42. After the viscous sealing material is dispensed to form divider 48, it tends to conform to the interior contours of the carrier 20 and of the cap, and of the chip 14. The contour matching structures of the divider 48 enables it to form a substantially air-tight seal with the chip and with the carrier, as well as with the cap 22. By forming such an air-tight seal, the divider isolates the two chambers 40 and 42 from one another.

The above described fabrication of a pressure sensing chip according to the invention employs integrated circuit batch processing techniques that can be applied to the fabrication of sensors that each have a single differential pressure cell or that each have an array of differential pressure cells for providing a wide range of pressure detection. By fabricating such an array of sensors on a single wafer, manufacturing costs can be significantly reduced. A more detailed description of the wafer fabrication process can be found in U.S. Pat. No. 5,220,838 issued to Clifford Fung et. al. on Jun. 22, 1993; the disclosure of which is incorporated by this reference.

Although preferred embodiments of the invention have been described hereinabove in detail, they illustrate the invention and thereby enable those skilled in this art to adapt the teachings herein to various different applications requiring modifications of the sensor structures and of the fabrication processes described. Thus, specific details of the disclosure herein are not intended to be necessary limitations on the scope of the invention other than as required by the prior art.

Having described the invention, what is claimed as new and secured by Letters Patent is:

1. Differential pressure sensor apparatus having an epitaxial semiconductor structure, said pressure sensor comprising a carrier having a carrier floor and a carrier wall extending from the carrier floor, a silicon substrate seated on the carrier floor and having a top surface defining a recess therein, a cap mounted on the carrier wall, the cap having a proximal aperture exposed to fluid at a first fluid pressure and a distal aperture exposed to fluid at a second fluid pressure, a polysilicon diaphragm having a periphery secured to said substrate, a deflecting region spanning the recess, an upper surface that, together with the carrier wall and said cap, defines an upper chamber, the upper chamber being in fluid communication, through the distal aperture in said cap, with the fluid at a second fluid pressure, and a lower surface that, together with the recess in the top surface of the substrate, defines a lower chamber, the lower chamber being in fluid communication, through the proximal aperture in said cap, with the fluid at a first fluid pressure, electrical detection means in communication with said diaphragm for generating an output signal indicative of the deflection of the deflection region due to a pressure differential exerted across the diaphragm by the first and second fluid pressures.

2. Pressure sensor apparatus in accordance with claim 1, further comprising means for dividing the upper chamber into a proximal chamber in fluid communication with the fluid at a first fluid pressure and a distal chamber in fluid communication with the fluid at a second fluid pressure.

3. Pressure sensor apparatus in accordance with claim 2, wherein said means for dividing the upper chamber includes a pressure seal for maintaining different pressures in the proximal chamber and in the distal chamber.

4. Pressure sensor apparatus according to claim 1, wherein the lower chamber has a floor disposed at a depth selected such that the floor forms a pressure stop for deflection of said diaphragm.

5. Pressure sensor apparatus according to claim 4 further comprising a release material coating for diminishing sticking of said diaphragm to the floor of the lower chamber.

6. A pressure sensor apparatus according to claim 1 further comprising a conductive pad mounted on said carrier, a conductive wire electrically coupling said electrical detection means with said conductive pad, and connective means mounted on said carrier and electrically coupled with said conductive pad for providing electrical connections to said electrical detection means.

7. Pressure sensor apparatus in accordance with claim 1, further comprising a pressure passage between the upper chamber and the lower chamber.

8. Differential pressure sensor apparatus having a semiconductor structure and comprising A. a silicon substrate having a top surface and having a cavity recessing said top surface, B. a polysilicon diaphragm deposited over and secured to said substrate and spanning the cavity, said diaphragm having opposite top and bottom faces, C. a first pressure port mounted with said substrate and disposed for receiving a first fluid pressure from a first direction along a first axis, D. an opening through a deflecting portion of said diaphragm, said opening for communicating to the cavity a first fluid pressure applied to said first pressure port, E. a second pressure port mounted with said substrate and disposed for receiving a second fluid pressure from the first direction, said second pressure port being structured for applying the second fluid pressure to the span of the top face of said diaphragm over said cavity, F. electrical detection means for detecting the deflection of said diaphragm due to a pressure differential exerted across the diaphragm by the first and second fluid pressures, G. a housing mounting said pressure ports and said substrate and for directing the first fluid pressure to a first portion of the diaphragm proximal to the pressure passage and for directing the second fluid pressure to a second portion of the diaphragm distal to the pressure passage, wherein said housing means includes i. a carrier for mounting said substrate, and ii. a cap assembled with said carrier, said first and second pressure ports being mounted on said cap, whereby said first and second fluid pressures are applied to the same side of the pressure sensor apparatus and act substantially exclusively on different faces of said diaphragm.

9. Pressure sensor apparatus in accordance with claim 1, further comprising coating means for coating said cavity.

10. Pressure sensor apparatus in accordance with claim 1, further comprising means for isolating said electrical detection means from said diaphragm.

11. Pressure sensor apparatus in accordance with claim 1, further comprising means for isolating said electrical detection means from said second fluid.

12. Differential pressure sensor apparatus having a semiconductor structure and comprising A. a silicon substrate having a top surface and having a cavity recessing said top surface, B. a polysilicon diaphragm deposited over and secured to said substrate and spanning the cavity, said diaphragm having opposite top and bottom faces, C. a first pressure port mounted with said substrate and disposed for receiving a first fluid pressure from a first direction along a first axis, D. an opening through a deflecting portion of said diaphragm, said opening for communicating to the cavity a first fluid pressure applied to said first pressure port, E. a second pressure port mounted with said substrate and disposed for receiving a second fluid pressure from the first direction, said second pressure port being structured for applying the second fluid pressure to the span of the top face of said diaphragm over said cavity, F. electrical detection means for detecting the deflection of said diaphragm due to a pressure differential exerted across the diaphragm by the first and second fluid pressures, G. means forming a first chamber proximal to the pressure passage and forming a second chamber distal to the pressure passage, whereby said first and second fluid pressures are applied to the same side of the pressure sensor apparatus and act substantially exclusively on different faces of said diaphragm.

13. Pressure sensor apparatus in accordance with claim 3 wherein said pressure seal comprises a pressure tight seal.

14. Pressure sensor apparatus in accordance with claim 3 wherein said pressure seal comprises a polymeric sealing material.

15. Pressure sensor apparatus according to claim 5 wherein said release material comprises a coating selected from a group consisting of an oxide coating and a nitride coating.

16. Pressure sensor apparatus in accordance with claim 1, wherein said cap is of a ceramic material.

17. Pressure sensor apparatus in accordance with claim 1, further comprising a dielectric layer between said diaphragm and said electrical detection means.

18. Pressure sensor apparatus in accordance with claim 17, wherein said dielectric layer comprises a silicon oxide layer between said diaphragm and a silicon nitride layer.

19. Pressure sensor apparatus in accordance with claim 7, wherein said pressure passage comprises an aperture in said diaphragm.

20. Pressure sensor apparatus in accordance with claim 7, wherein said pressure passage comprises a channel connecting said upper chamber to said lower chamber.

* * * * *